United States Patent
Fujiwara

(10) Patent No.: US 8,257,210 B2
(45) Date of Patent: Sep. 4, 2012

(54) ROTATION URGING MECHANISM AND PULLEY DEVICE

(75) Inventor: Hideki Fujiwara, Nara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 294 days.

(21) Appl. No.: 12/453,875

(22) Filed: May 26, 2009

(65) Prior Publication Data

US 2009/0298629 A1    Dec. 3, 2009

(30) Foreign Application Priority Data

May 27, 2008  (JP) ................. 2008-138061
May 27, 2008  (JP) ................. 2008-138118

(51) Int. Cl.
*F16H 9/00*     (2006.01)
*F16H 55/36*    (2006.01)
*F16D 23/00*    (2006.01)
*F16D 11/04*    (2006.01)
*F16D 13/22*    (2006.01)

(52) U.S. Cl. ....... 474/74; 474/199; 474/112; 192/56.57; 192/56.54; 192/66.1

(58) Field of Classification Search .......... 474/199, 474/74, 112; 192/54.52, 56.57, 56.54, 56.62
See application file for complete search history.

(56) References Cited

U.S. PATENT DOCUMENTS

| | | | | |
|---|---|---|---|---|
| 2,279,887 A * | 4/1942 | Hathorn | ............... | 254/398 |
| 2,421,685 A * | 6/1947 | Crot et al. | ............... | 384/498 |
| 3,087,588 A * | 4/1963 | Fischer | ............... | 192/45 |
| 3,370,899 A * | 2/1968 | Eklund | ............... | 384/516 |
| 3,392,431 A * | 7/1968 | Bisang | ............... | 26/99 |
| 3,649,093 A * | 3/1972 | Muratore et al. | ............... | 384/463 |
| 4,565,457 A * | 1/1986 | Flander | ............... | 384/450 |
| 5,156,573 A | 10/1992 | Bytzek et al. | | |
| 5,244,435 A * | 9/1993 | Billett | ............... | 474/184 |
| 5,356,227 A * | 10/1994 | Sibley et al. | ............... | 384/463 |
| 5,501,530 A * | 3/1996 | Nagai et al. | ............... | 384/516 |
| 6,055,397 A * | 4/2000 | Lee | ............... | 399/165 |
| 6,481,898 B1 * | 11/2002 | Yakura et al. | ............... | 384/516 |
| 6,588,560 B1 * | 7/2003 | Fujiwara | ............... | 192/45 |
| 6,655,846 B2 * | 12/2003 | Beckers et al. | ............... | 384/513 |
| 2005/0037877 A1 * | 2/2005 | Ishiguro et al. | ............... | 474/70 |

FOREIGN PATENT DOCUMENTS

JP    05-180287    7/1993

* cited by examiner

*Primary Examiner* — Michael Mansen
*Assistant Examiner* — Minh Truong
(74) *Attorney, Agent, or Firm* — McGinn IP Law Group, PLLC

(57) ABSTRACT

A rotation urging mechanism includes: an outer member which has an outer raceway surface on its inner periphery and is rotatable about a first axis; an inner member which has on its outer periphery an inner raceway surface disposed in face-to-face relation to a radially inner side of the outer raceway surface over an entire circumference thereof and is rotatable about the first axis; and a plurality of balls disposed rollably between the outer raceway surface and the inner raceway surface. The outer raceway surface is formed about a second axis which is inclined with respect to the first axis, and the inner raceway surface is formed about a third axis which is inclined with respect to the first axis.

16 Claims, 9 Drawing Sheets

ROTATION URGING MECHANISM AND PULLEY DEVICE

BACKGROUND OF THE INVENTION

The present invention relates to a rotation urging mechanism having spring resiliency in the rotating direction and to a pulley device having the rotation urging mechanism.

An alternator which is used as an auxiliary machine of an engine of an automobile or the like is driven by the rotational force fetched from a crankshaft to supply electric power necessary for the traveling of the automobile. A pulley device for an alternator is mounted on an input shaft of the alternator, and the rotational force of the engine is transmitted to the alternator as a belt is trained between the pulley device for an alternator and a pulley mounted on the crankshaft.

In general, the rotational force is imparted to the crankshaft of the engine of the automobile and etc. by the explosive force within a cylinder, variations occur in the rotational speed of the crankshaft. Meanwhile, in the alternator, an armature and etc. which are relatively heavyweight rotate integrally with the input shaft. If the variation of the rotational speed of the crankshaft is rapid, there are cases where the armature is unable to follow the variation of the rotational speed of the crankshaft owing to the inertial force produced by the rotation of itself.

If the alternator is unable to follow the aforementioned variation of the rotational speed, a difference temporarily arises between the rotational speed of the crankshaft and the alternator, in which case slippage can occur between the pulley for an alternator and the belt, or the tension of the belt can vary excessively. Such slippage of the belt and the excessive variation of the tension can cause the generation of abnormal noise of the belt, a decline in its service life, and the like. In addition, there are cases where the initial tension of the belt is sometimes set relatively high to prevent the slippage of the belt, in which case the rotational resistance of the crankshaft increase, possibly lowering the fuel consumption performance of the engine.

For this reason, in order to allow the variation of the rotational speed transmitted from the crankshaft, a conventional pulley device for an alternator is provided with a rotation urging mechanism between a pulley member around which the belt is wound and a pulley boss which is integrally fixed to an input shaft of the alternator rotatably.

As the rotation urging mechanism, JP-A-5-180287 discloses a technique in which a torsion coil spring is provided between the pulley member and the pulley boss, and the pulley member and the pulley boss are temporarily relatively rotated resiliently in the circumferential direction to thereby alleviate the variation of the rotational speed.

With the rotation urging mechanism of JP-A-5-180287, the alleviation characteristic of the variation of its rotation with respect to the pulley boss of the pulley member is dependent on the torsion coil spring. However, since this torsion coil spring is limited to the size of such a measure that the torsion coil spring can be built into that pulley device for an alternator, its wire diameter, free length, number of turns, and the like are limited, so that the characteristics of the torsion coil spring cannot be set freely. In addition, the spring constant of the torsion coil spring is fixed, and therefore the spring constant cannot be varied freely in accordance with the helix angle. For this reason, the degree of freedom in setting the alleviation characteristic of the variation of rotation as the pulley device for an alternator is unfavorably limited. Hence, there is a possibility that the variation of the rotational speed of the crankshaft cannot be alleviated sufficiently. In addition, owing to the provision of the coil spring, the strength of the pulley device declines, which is disadvantageous in terms of the durability.

SUMMARY OF THE INVENTION

The present invention has been devised in view of the above-described circumstances, and its object is to provide a rotation urging mechanism and a pulley device which are capable of more effectively alleviating the variation of the rotational speed between an outer member such as a pulley member and an inner member such as a pulley boss.

To attain the above object, in accordance with a first aspect of the invention there is provided a rotation urging mechanism comprising: an outer member which has an outer raceway surface on its inner periphery and is rotatable about a first axis; an inner member which has on its outer periphery an inner raceway surface disposed in face-to-face relation to a radially inner side of the outer raceway surface over an entire circumference thereof and is rotatable about the first axis; and a plurality of balls disposed rollably between the outer raceway surface and the inner raceway surface, wherein the outer raceway surface is formed about a second axis which is inclined with respect to the first axis, and the inner raceway surface is formed about a third axis which is inclined with respect to the first axis.

In addition, in accordance with a second aspect of the invention there is provided a pulley device comprising: a pulley member having an outer periphery around which a belt is wound; a shaft disposed on an inner peripheral side of the pulley member coaxially with the pulley member; and a rotation urging mechanism disposed between the pulley member and the shaft, wherein the rotation urging mechanism includes: an outer raceway surface provided on an inner peripheral side of the pulley member; an inner raceway surface disposed on an outer peripheral side of the shaft in face-to-face relation to a radially inner side of the outer raceway surface over an entire circumference thereof; and a plurality of balls disposed rollably between the outer raceway surface and the inner raceway surface, wherein the outer raceway surface is formed about a second axis which is inclined with respect to an axis of rotation of the pulley member, and the inner raceway surface is formed about a third axis which is inclined with respect to the axis of rotation of the pulley member.

According to the above-described rotation urging mechanism and the pulley device, when, for example, the outer member (pulley member) is rotated about the first axis (axis of rotation of the pulley member) in face-to-face relation to the inner member (shaft), the balls roll on the outer raceway surface by accompanying the rotation of the outer raceway surface. Since the outer raceway surface and the inner raceway surface are formed about the second and third axes which are inclined with respect to the first axis, the outer raceway surface is not only relatively moved in the circumferential direction but is relatively moved in the axial direction with respect to the inner raceway surface. Then, because of this relative movement in the axial direction, a disposing space for the balls between the outer raceway surface and the inner raceway surface becomes gradually narrow in the axial direction. Meanwhile, the balls, while rolling by accompanying the rotation of the outer raceway surface, are gradually clamped firmly in the axial direction between the outer raceway surface and the inner raceway surface in the aforementioned disposing space which is gradually narrowed. Owing to this action, a resilient force (rotation urging force) is generated in a direction in which the relative rotation between the outer raceway surface and the inner raceway surface is alleviated. Then, when the angle of relative rotation between the outer raceway surface and the inner raceway surface reaches a predetermined angle, the relative rotation between the outer raceway surface and the inner raceway surface is restricted by the balls, so that the outer member and the inner member rotate integrally.

Accordingly, it becomes possible to resiliently absorb (alleviate) the variation of rotation between the outer member and the inner member within a range in which the outer raceway surface and the inner raceway surface are relatively rotatable. In addition, the alleviation characteristic of the variation of rotation can be set freely by changing such as the radii of curvature of the outer raceway surface and the inner raceway surface and the radius of the balls, thereby making it possible to effectively alleviate the variation of rotation.

In addition, it becomes possible to form the rotation urging mechanism by a very simple structure without requiring a torsion coil spring and a complex structure for providing the torsion coil spring such as in the conventional art. Hence, the miniaturization of the rotation urging mechanism also becomes possible. In addition, as for the outer member and the inner member, the outer raceway surface and the inner raceway surface can be respectively formed about the second and third axes by a substantially identical method to a working method for raceway surfaces of general rolling bearings, so that the fabrication is facilitated. In addition, the rotation urging mechanism assumes a form similar to that of a rolling bearing by the outer member, the inner member, and the balls, so that it becomes possible to support the radial load acting on the outer member and the inner member.

Preferably, angles of inclination of the second axis and the third axis with respect to the first axis are identical. By virtue of this construction, the working of the outer raceway surface of the outer member and the working of the inner raceway surface of the inner member can be effected in a substantially similar form, thereby making it possible to improve the workability.

Preferably, cages for respectively maintaining intervals between adjacent ones of the balls are respectively provided between the adjacent ones of the plurality of balls, and the cages are separated from each other. By virtue of this construction, it becomes possible to hold the balls at equal intervals between the outer raceway surface and the inner raceway surface and to separately move the balls smoothly in the axial direction. However, an integral type cage in which a plurality of pockets are formed may be used, or a full complement type not provided with the cage may be used.

In accordance with a third aspect of the invention, there is provided a rotation urging mechanism comprising: an outer member which has an outer raceway surface on its inner periphery and is rotatable about a first axis; an inner member which has on its outer periphery an inner raceway surface disposed on a radially inner side of the outer raceway surface and is rotatable about the first axis; and a ball disposed rollably between the outer raceway surface and the inner raceway surface, wherein one raceway surface of the outer raceway surface and the inner raceway surface is formed about a second axis which is inclined with respect to the first axis, and another raceway surface of the outer raceway surface and the inner raceway surface is formed about a third axis which is inclined with respect to the second axis and is disposed so as to cross the one raceway surface, and wherein the ball is disposed at a portion of intersection between the outer raceway surface and the inner raceway surface.

In accordance with a fourth aspect of the invention, there is provided a pulley device comprising: a pulley member having an outer periphery around which a belt is wound; a shaft disposed on an inner peripheral side of the pulley member coaxially with the pulley member; and a rotation urging mechanism disposed between the pulley member and the shaft, wherein the rotation urging mechanism includes: an outer raceway surface provided on an inner peripheral side of the pulley member; an inner raceway surface disposed on an outer peripheral side of the shaft on a radially inner side of the outer raceway surface; and a ball disposed rollably between the outer raceway surface and the inner raceway surface, wherein one raceway surface of the outer raceway surface and the inner raceway surface is formed about a second axis which is inclined with respect to an axis of rotation of the pulley member, and another raceway surface of the outer raceway surface and the inner raceway surface is formed about a third axis which is inclined with respect to the second axis and is disposed so as to cross the one raceway surface, and wherein the ball is disposed at a portion of intersection between the outer raceway surface and the inner raceway surface.

According to the above-described rotation urging mechanism and the pulley device, when, for example, the outer member (pulley member) is rotated about the first axis (axis of rotation of the pulley member) in face-to-face relation to the inner member (shaft), the balls roll to a position circumferentially offset from the portion of intersection between the outer raceway surface and the inner raceway surface by accompanying the rotation of this outer raceway surface. At a position circumferentially offset from that portion of intersection, the radial interval between the outer raceway surface and the inner raceway surface gradually decreases in the form of a wedge, so that as the balls forcibly enter this wedge-shaped space, the balls are gradually clamped firmly between the outer raceway surface and the inner raceway surface. By virtue of this action, the resilient force (rotation urging force) is generated in the direction in which the relative rotation between the outer raceway surface and the inner raceway surface is alleviated. Then, when the angle of relative rotation between the outer raceway surface and the inner raceway surface reaches a predetermined angle, the relative rotation between the outer raceway surface and the inner raceway surface is restricted by the balls, so that the outer member and the inner member rotate integrally.

Accordingly, it becomes possible to resiliently absorb (alleviate) the variation of rotation between the outer member and the inner member within a range in which the outer raceway surface and the inner raceway surface are relatively rotatable. In addition, the alleviation characteristic of the variation of rotation can be set freely by changing such as the radii of curvature of the outer raceway surface and the inner raceway surface and the radius of the balls, thereby making it possible to effectively alleviate the variation of rotation.

In addition, it becomes possible to form the rotation urging mechanism by a very simple structure without requiring a torsion coil spring and a complex structure for providing the torsion coil spring such as in the conventional art. Hence, the miniaturization of the rotation urging mechanism also becomes possible. In addition, as for the outer member and the inner member, the outer raceway surface and the inner raceway surface can be respectively formed about the second and third axes by a substantially identical method to a working method for raceway surfaces of general rolling bearings, so that the fabrication is facilitated.

In addition, the rotation urging mechanism assumes a form similar to that of a rolling bearing by the outer member, the inner member, and the balls, so that it becomes possible to support the radial load acting on the outer member and the inner member.

The third axis is preferably aligned with the first axis. Hence, the other raceway surface can be worked by the same method as a method for working the raceway surfaces of rolling bearings, so that the workability can be improved further.

Accordingly, the variation of the rotational speed between the outer member and the inner member can be alleviated more effectively.

DESCRIPTION OF PREFERRED EMBODIMENTS

First Embodiment

Figure 1:
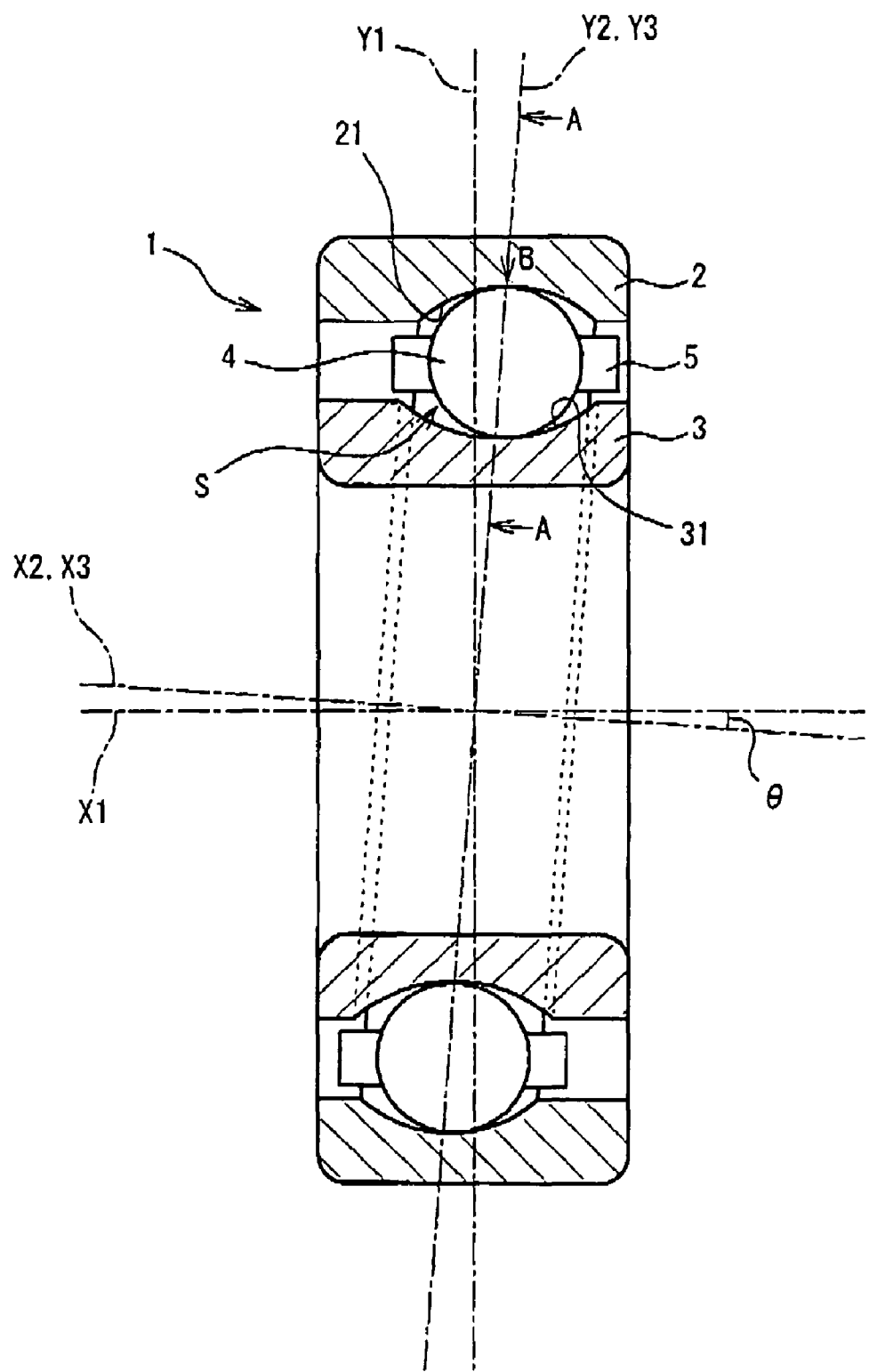
FIG. 1 is a cross-sectional view of a rotation urging mechanism in accordance with a first embodiment of the invention.

FIG. 1 is a cross-sectional view of a rotation urging mechanism in accordance with a first embodiment of the invention. This rotation urging mechanism 1 is comprised of an annular outer ring (outer member) 2 having an outer raceway surface 21 on its inner periphery; an annular inner ring (inner member) 3 having an inner raceway surface 31 on its outer periphery; a plurality of balls 4 disposed between the outer raceway surface 21 and the inner raceway surface 31; and cages 5 for maintaining the intervals between the respective balls 4. The outer ring 2, the inner ring 3, the balls 4, and the cages 5 are formed of a metal such as a bearing steel. The outer ring 2 and the inner ring 3 are rotatable about a first axis X1. As for the outer raceway surface 21 and the inner raceway surface 31, the shape of their cross sections cut along a plane passing through the first axis X1 is formed in a concave arcuate shape (curved concave shape), and its radius of curvature is set greater than the radius of the ball 4. The plurality of balls 4 are arranged over the entire circumference between the outer raceway surface 21 and the inner raceway surface 31 in a state of being spaced apart from each other in the circumferential direction.

The outer raceway surface 21 is formed about a second axis X2 which is inclined with respect to the first axis X1. In other words, the outer raceway surface 21 is formed in parallel with a plane Y2 which is inclined with respect to a vertical plane Y1 perpendicular to the first axis X1. In addition, the inner raceway surface 31 is formed about a third axis X3 which is inclined with respect to the first axis X1. In other words, the inner raceway surface 31 is formed in parallel to a plane Y3 which is inclined with respect to the vertical plane Y1 perpendicular to the first axis X1. In this embodiment, the second axis X2 and the third axis X3 are inclined with the same angle of inclination θ with respect to the first axis X1.

In the state shown in FIG. 1, the second axis X2 of the outer raceway surface 21 and the third axis X3 of the inner raceway surface 31 are aligned with each other, so that the outer raceway surface 21 and the inner raceway surface 31 are disposed substantially in parallel, and oppose each other over the entire circumferential direction. Hereafter, this state will be referred to as a reference state. Then, if, for example, the inner ring 3 is set at a standstill, and the outer ring 2 is rotated about the first axis X1, the outer raceway surface 21 is positionally offset in the circumferential direction and the axial direction with respect to the inner raceway surface 31. Hereafter, a description will be given of the operation at this time with reference to FIGS. 2 and 3.

Figure 2A:
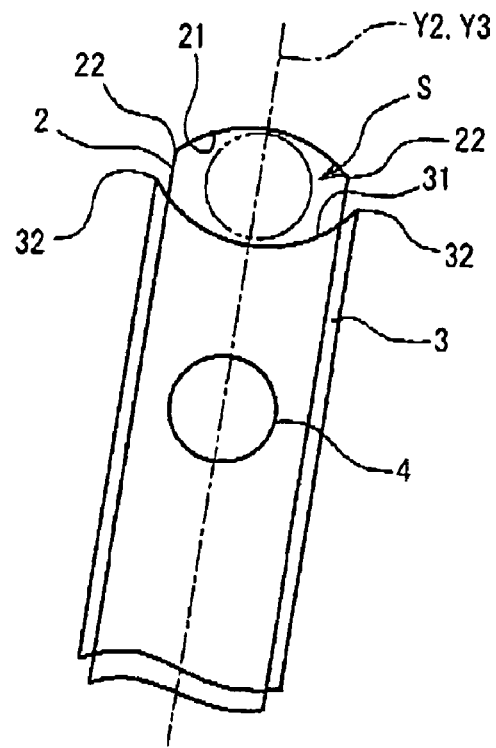
FIGS. 2A and 2B are schematic elevation views for explaining the operation of the rotation urging mechanism.
Figure 2B:
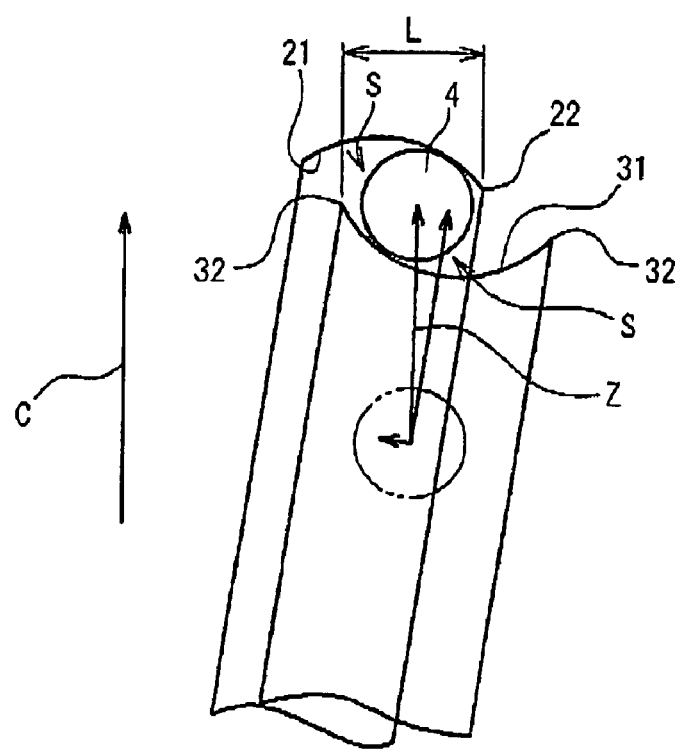
Figure 3A:
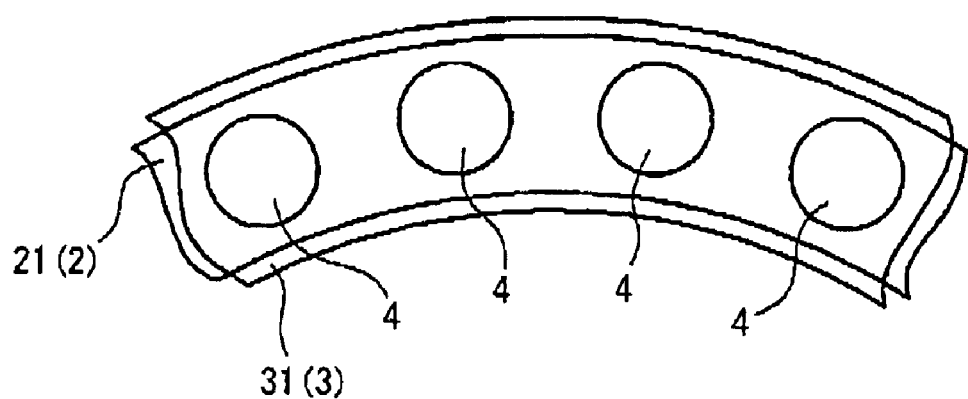
FIGS. 3A and 3B are schematic plan views for explaining the operation of the rotation urging mechanism.
Figure 3B:
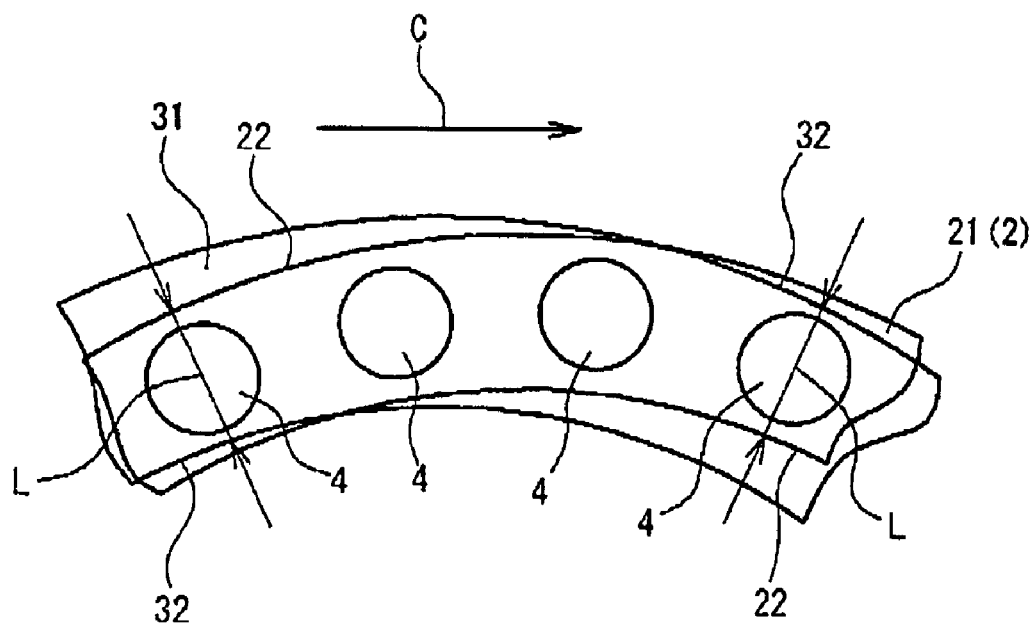

FIGS. 2A and 2B are schematic elevation views illustrating the operation of the rotation urging mechanism 1, and FIGS. 3A and 3B are schematic plan views thereof. In FIGS. 2A and 3A, the outer raceway surface 21 and the inner raceway surface 31 are in the reference state. Further, when the outer raceway surface 21 rotates in the direction of arrow C with respect to the inner raceway surface 31, as shown in FIGS. 2B and 3B, the outer raceway surface 21 is relatively moved not only in the circumferential direction but also in the axial direction with respect to the inner raceway surface 31 owing to its inclination with respect to the vertical plane Y1 (FIG. 1). Because of this relative movement in the axial direction, the balls 4 roll as indicated by arrow Z, and an accommodating space S for the balls 4 between the outer raceway surface 21 and the inner raceway surface 31 becomes gradually narrow in the axial direction (the axial width of the accommodating space S is indicated by L), so that the balls 4 are clamped firmly between the vicinity of a shoulder portion 32 of the inner raceway surface 31 and the vicinity of a shoulder portion 22 of the outer raceway surface 21, thereby restricting the relative movement of the outer raceway surface 21 and the inner raceway surface 31. As a result, the inner raceway surface 31 integrally rotates by following the outer raceway surface 21.

In the process in which the outer raceway surface 21 and the inner raceway surface 31 relatively move in the axial direction, the contact pressure between the balls 4 and each of the outer raceway surface 21 and the inner raceway surface 31 is gradually increased. Then, a rotation urging force (torsion spring force) in a direction in which the relative rotation between the outer raceway surface 21 and the inner raceway surface 31 is alleviated (in an opposite direction to the direction of the relative rotation) is generated by the elastic deformation of the balls 4 and the both raceway surfaces 21 and 31 accompanying the contact between the balls 4 and each of the both raceway surfaces 21 and 31. In addition, as the amount of relative movement in the axial direction between the outer raceway surface 21 and the inner raceway surface 31 becomes large, the spring constant of the rotation urging mechanism 1 gradually increases, and its rotation urging force also increases concomitantly.

In the above-described construction, the outer ring 2 and the inner ring 3 are relatively rotatable within a predetermined range, and in a case where a variation of rotation has occurred between the outer ring 2 and the inner ring 3 in the state in which the two rings 2 and 3 integrally rotate, the variation of rotation can be resiliently absorbed (alleviated) within that range of relative rotation.

In addition, the alleviation characteristic of the variation of rotation can be set freely by changing such as the radii of curvature and the groove depths of the outer raceway surface 21 and the inner raceway surface 31 and the radius of the balls 4. For example, if the radii of curvature of the outer raceway surface 21 and the inner raceway surface 31 are made large, the range of relative rotation of the outer raceway surface 21 and the inner raceway surface 31 also becomes large, and the spring constant (spring stiffness) of the rotation urging mechanism 1 can be set small. Accordingly, it becomes possible to effectively alleviate the variation of rotation between the outer member 2 and the inner member 3 in correspondence with the rotation characteristics and the like of the outer ring 2 and the inner ring 3.

In addition, it becomes possible to form the rotation urging mechanism 1 by a very simple structure in which the outer raceway surface 21 and the inner raceway surface 31 are respectively formed on the outer member 2 and the inner member 3 and the balls 4 are disposed between the both raceway surfaces, without requiring a torsion coil spring and a complex structure for providing the torsion coil spring such as in the conventional art. Hence, the miniaturization of the rotation urging mechanism 1 also becomes possible. In addition, since the outer raceway surface 21 and the inner raceway surface 31 are formed as grooves which are uniform in the circumferential direction about the second and third axes X2 and X3, the outer raceway surface 21 and the inner raceway surface 31 can be formed by a substantially identical method to a working method (grinding method) for raceway surfaces of general rolling bearings, so that the fabrication (working) is facilitated. Furthermore, since the rotation urging mechanism 1 assumes a form similar to that of a rolling bearing by the outer member 2, the inner member 3, and the balls 4, it becomes possible to support the radial load acting on the outer ring 2 and the inner ring 3.

Figure 4A:
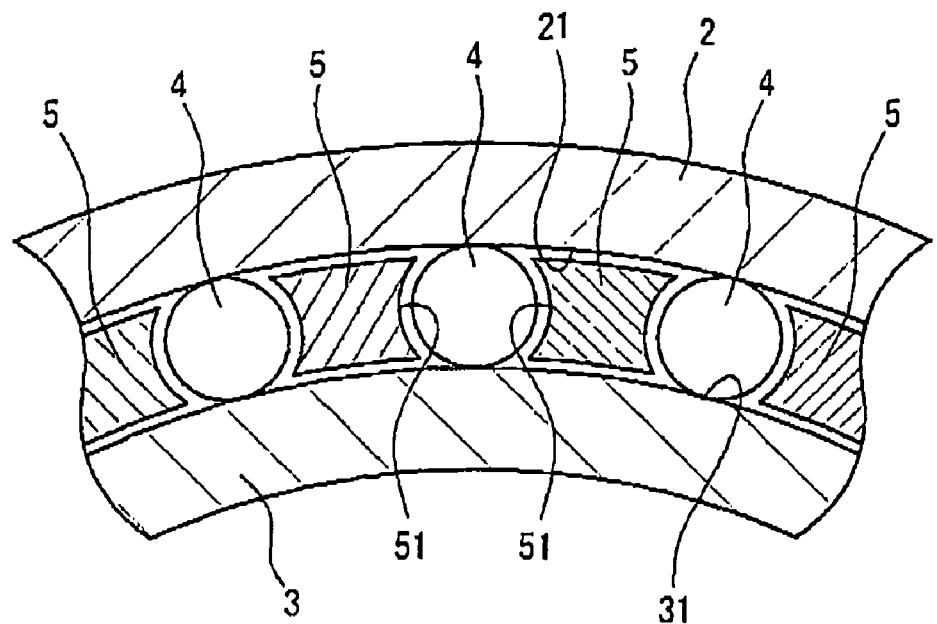
FIG. 4A is a cross-sectional view taken in the direction of arrows along line A-A in FIG. 1.
Figure 4B:
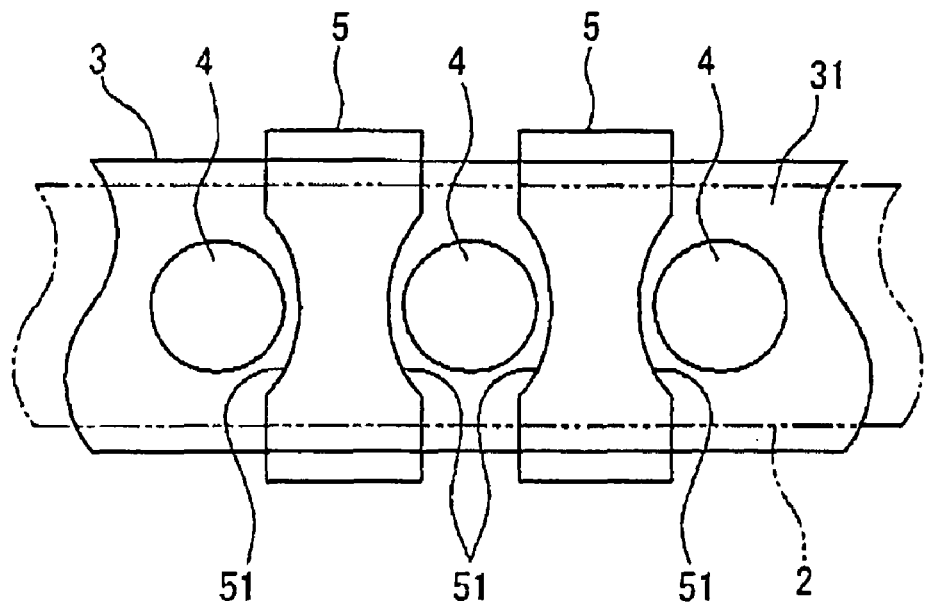
FIG. 4B is a schematic view taken in the direction of arrow B in FIG. 1

FIG. 4 is a cross-sectional view taken in the direction of arrows along line A-A in FIG. 1, and FIG. 4B is a schematic view taken in the direction of arrow B in FIG. 1. The cages 5 are respectively provided in correspondence with the intervals between the balls 4. The cages 5 are not connected to each other and are in a separated state. An opposing surface 51 having a concave arcuate shape (curved concave shape) opposing the respective ball 4 is formed on each cage 5. As shown in FIG. 4B, the radius of curvature of the opposing surface is formed to be greater than the radius of the ball 4. As the cages 5 maintain the intervals so that the adjacent ones of the balls 4 do not contact each other, and the cages 5 are set in the mutually separated state, the cages 5 are capable of allowing the movement of the balls 4 in the axial direction in consequence of the relative movement between the outer raceway surface 21 and the inner raceway surface 31 in the axial direction.

The present invention may be altered in design, as required, without being limited to the above-described embodiment. For example, the angle of inclination of the second axis X2 and the angle of inclination of the third axis X3 with respect to the first axis X may not necessarily be aligned with each other, and these angles of inclination may be made different insofar as the both raceway surfaces 21 and 31 are opposed to each other over the entire circumference, and the disposing space for the balls 4 can be secured between their opposing surfaces.

Second Embodiment

Figure 5:
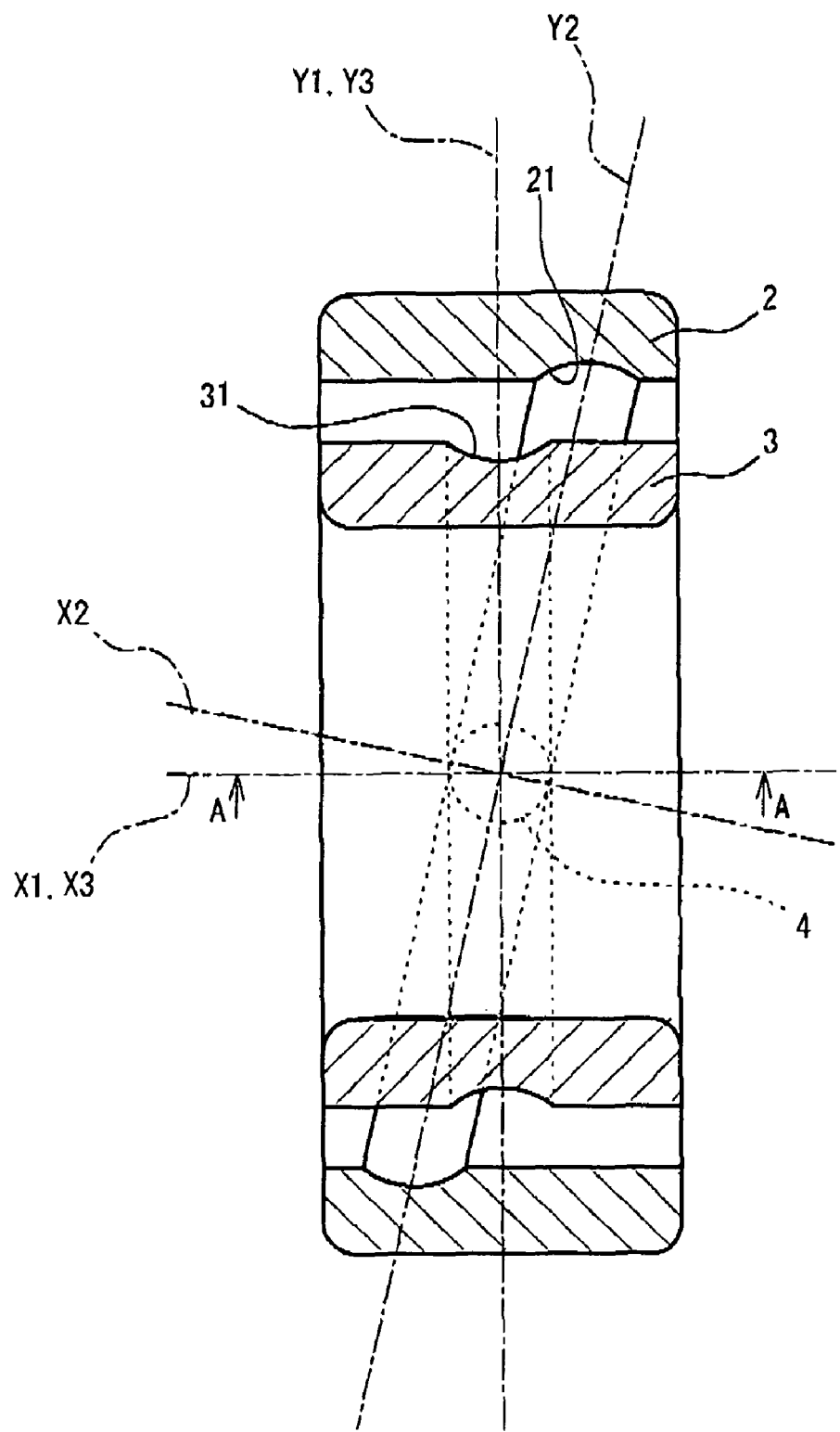
FIG. 5 is a cross-sectional view of a rotation urging mechanism in accordance with a second embodiment of the invention.
Figure 6:
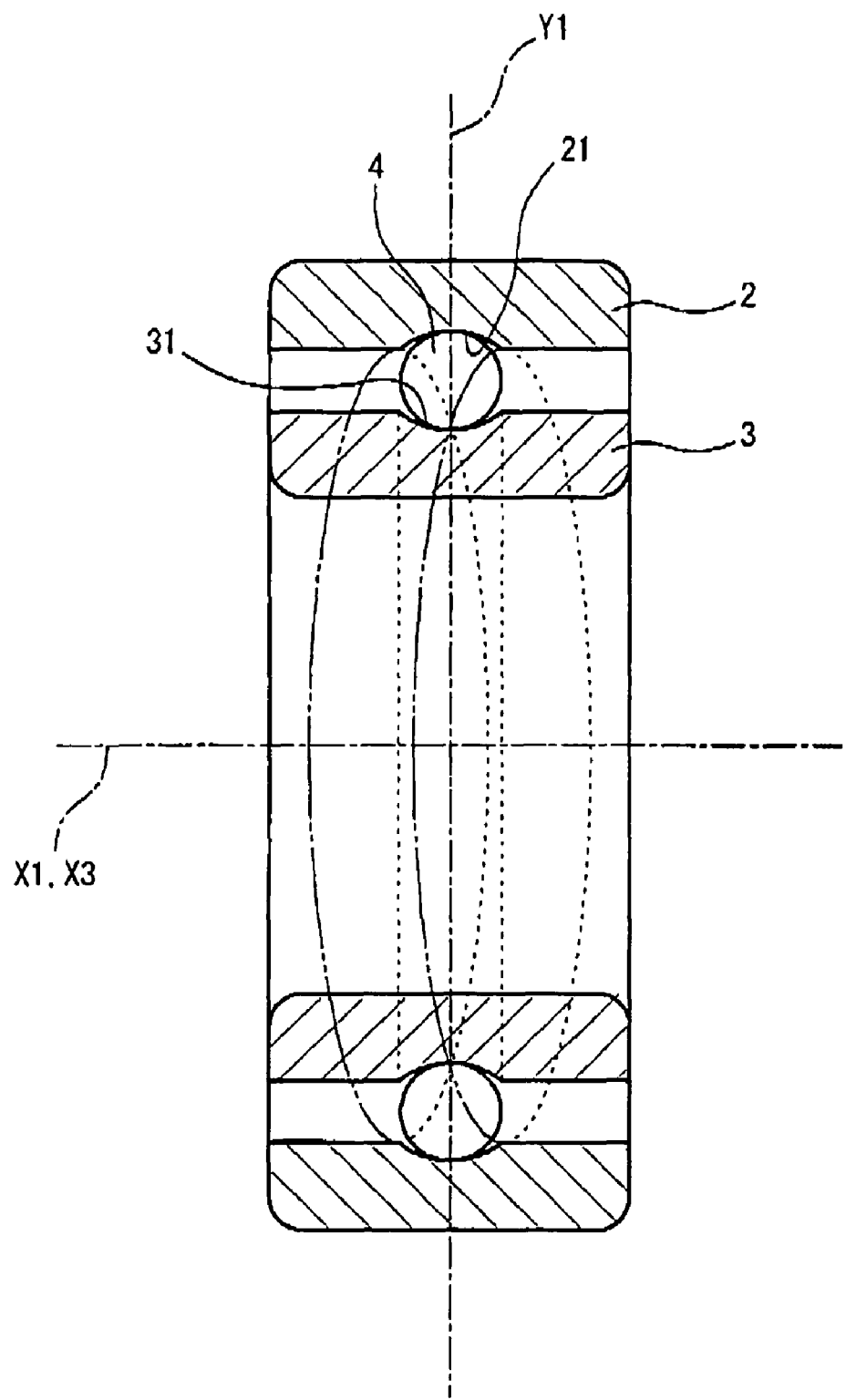
FIG. 6 is a cross-sectional view taken in the direction of arrows along line A-A in FIG. 5.

FIG. 5 is a cross-sectional view of the rotation urging mechanism 1 in accordance with a second embodiment of the invention. FIG. 6 is a cross-sectional view taken in the direction of arrows along line A-A in FIG. 5. This rotation urging mechanism 1 is comprised of the annular outer ring (outer member) 2 having the outer raceway surface 21 on its inner periphery; the annular inner ring (inner member) 3 having the inner raceway surface 31 on its outer periphery; and the plurality of balls 4 disposed between the outer raceway surface 21 and the inner raceway surface 31. Those component parts and portions that are identical to those of the first embodiment will be denoted by the same reference numerals, and a description of the overlapping portions will be omitted.

As shown in FIG. 5, the outer raceway surface 21 is formed about the second axis X2 which is inclined with respect to the first axis X1. In other words, the outer raceway surface 21 is formed in parallel with the plane Y2 which is inclined with respect to the vertical plane Y1 perpendicular to the first axis X1. In addition, the inner raceway surface 31 is formed about the third axis X3 which is aligned with the first axis X1. In other words, the inner raceway surface 31 is formed in parallel to the vertical planes Y1 and Y3 which are perpendicular to the first and third axes X1 and X3. Accordingly, the third axis X3 of the inner raceway surface 31 is inclined with respect to the second axis X2 of the outer raceway surface 21.

In FIG. 6, the outer raceway surface 21 and the inner raceway surface 31 intersect each other at upper and lower two portions, and the balls 4 are disposed at the intersecting portions. Then, if, for example, the inner ring 3 is set at a standstill, and the outer ring 2 is rotated about the first axis X1, the balls 4 move in the circumferential direction by accompanying the movement of the outer raceway surface 21. Hereafter, a description will be given of the operation at this time with reference to FIGS. 7A and 7B.

Figure 7A:
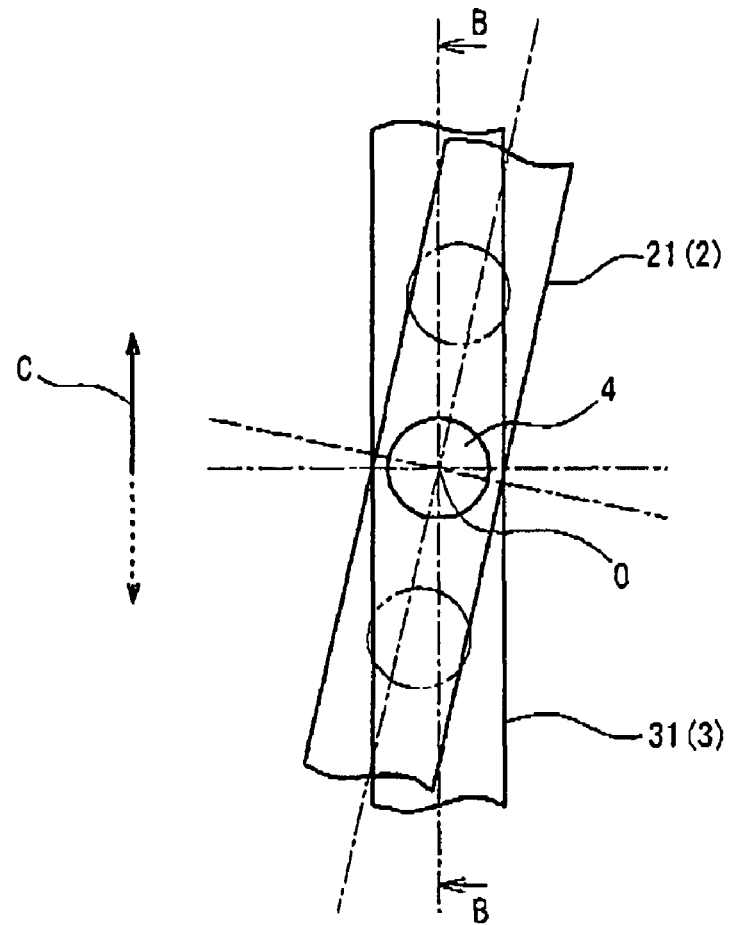
FIG. 7A is a schematic elevation view for explaining the operation of the rotation urging mechanism.
Figure 7B:
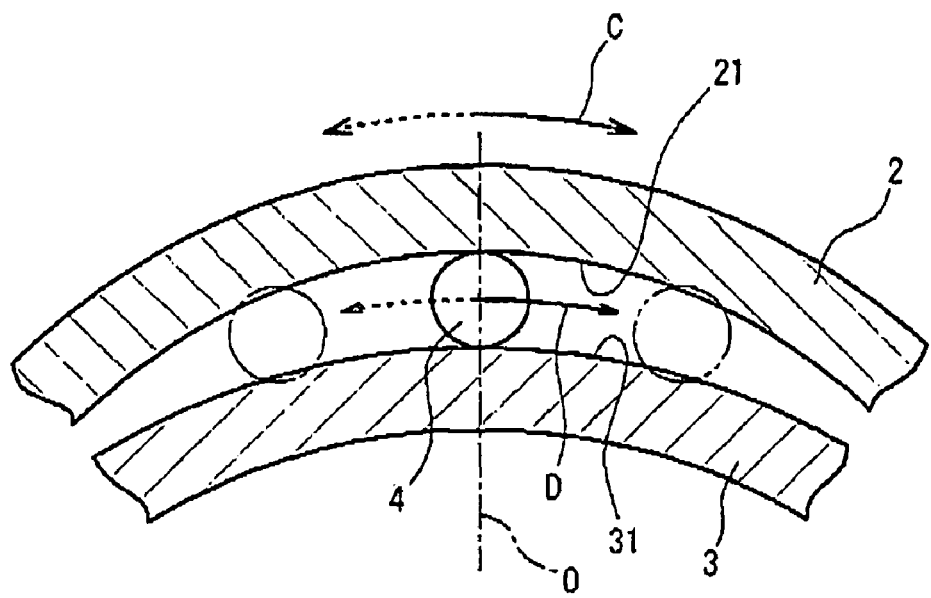
FIG. 7B is a schematic cross-sectional view taken in the direction of arrows along line B-B in FIG. 7A.

FIG. 7A is a schematic elevation view for explaining the operation of the rotation urging mechanism 1, and FIG. 7B is a schematic cross-sectional view taken in the direction of arrows along line B-B in FIG. 7A. When the outer raceway surface 21 rotates in the direction of arrow C with respect to the inner raceway surface 31, as shown in FIGS. 7A and 7B, the outer raceway surface 21 relatively moves in the circumferential direction by accompanying the rotation of the outer raceway surface 21, as shown by arrow D. At this time, at a position circumferentially offset from a center of intersection O between the outer raceway surface 21 and the inner raceway surface 31, the radial interval between the outer raceway surface 21 and the inner raceway surface 31 gradually decreases in the form of a wedge (see FIG. 7B), so that the balls 4 are gradually clamped firmly between the outer raceway surface 21 and the inner raceway surface 31, thereby restricting the relative movement of the outer raceway surface 21 and the inner raceway surface 31. As a result, the inner raceway surface 31 integrally rotates by following the outer raceway surface 21. It should be noted that when the outer raceway surface 21 rotates in the opposite direction (indicated by a dotted-line arrow), the balls 4 roll in the opposite direction (indicated by a dotted-line arrow), and operate in the same way as described above.

In the process in which the outer raceway surface 21 and the inner raceway surface 31 relatively move in the axial direction, the contact pressure between the balls 4 and each of the outer raceway surface 21 and the inner raceway surface 31 is gradually increased. Then, a rotation urging force (torsion spring force) in a direction in which the relative rotation between the outer raceway surface 21 and the inner raceway surface 31 is alleviated (in an opposite direction to the direction of the relative rotation) is generated by the elastic deformation of the balls 4 and the both raceway surfaces 21 and 31 accompanying the contact between the balls 4 and each of the both raceway surfaces 21 and 31. In addition, as the amount of relative movement in the axial direction between the outer raceway surface 21 and the inner raceway surface 31 becomes large, the spring constant of the rotation urging mechanism 1 gradually increases, and its rotation urging force also increases concomitantly.

In the above-described construction, in a case where a variation of rotation has occurred between the outer ring 2 and the inner ring 3, the variation of rotation can be resiliently absorbed (alleviated) within that range of relative rotation in the same way as in the first embodiment.

In addition, the alleviation characteristic of the variation of rotation can be set freely by changing such as the radii of curvature and the groove depths of the outer raceway surface 21 and the inner raceway surface 31, the radius of the balls 4, and the angle of intersection between the outer raceway surface 21 and the inner raceway surface 31.

In addition, according to the second embodiment, in the same way as in the first embodiment, the miniaturization of the rotation urging mechanism 1 is possible, and the fabrication (working) of the rotation urging mechanism 1 is facilitated.

The present invention may be altered in design, as required, without being limited to the above-described embodiment. For example, the second axis X2 of the outer raceway surface 21 and the first axis X1 may be aligned with each other, and the third axis X3 of the inner raceway surface 31 may be inclined with respect to the first axis X1. Still further, both the second and third axes X2 and X3 may be inclined with respect to the first axis X1.

Hereafter, a description will be given of an example of application of the rotation urging mechanisms 1 in accordance with the first and second embodiments of the invention.

Figure 8:
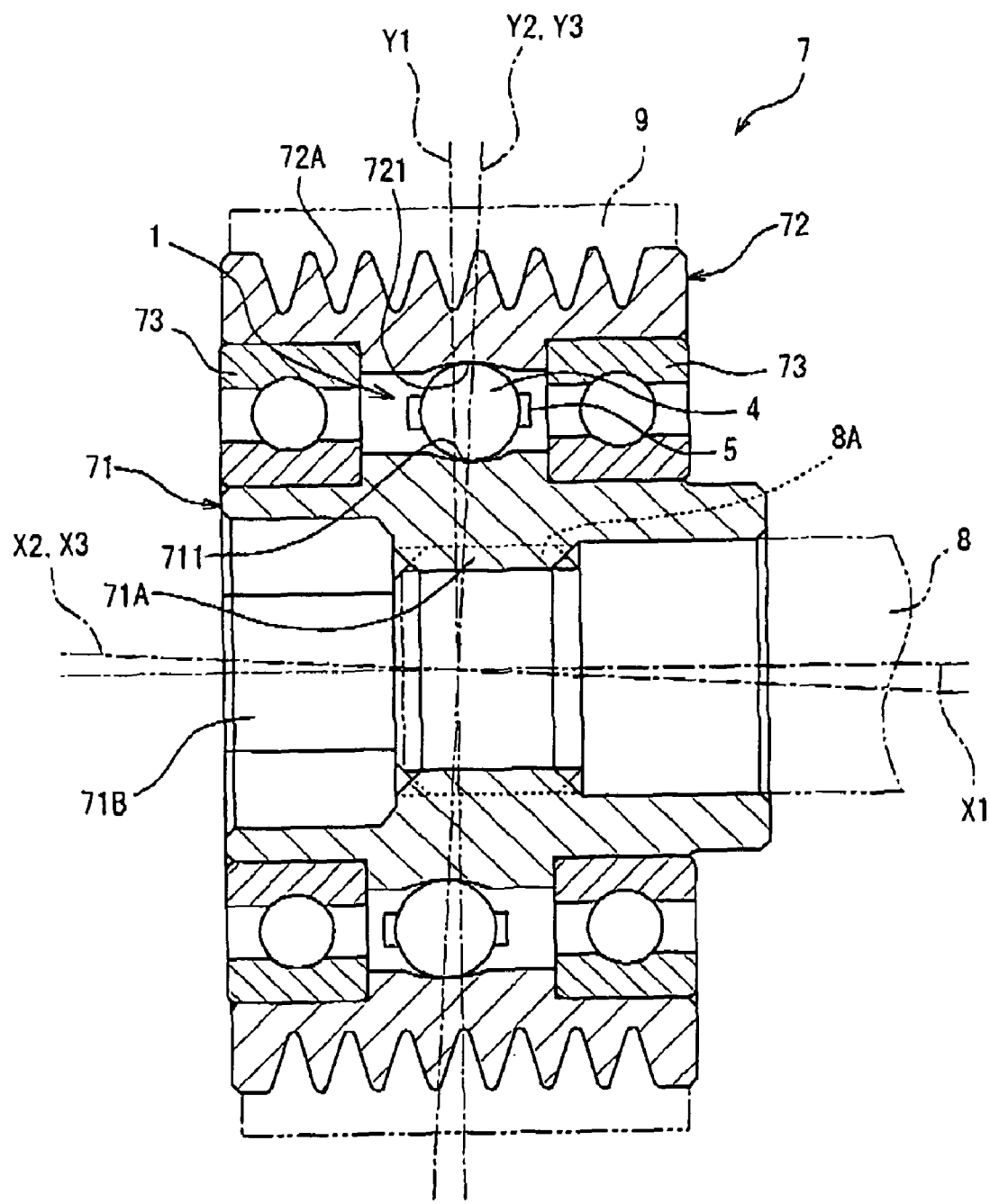
FIG. 8 is a cross-sectional view of a pulley device to which the rotation urging mechanism in accordance with the first embodiment is applied.
Figure 9:
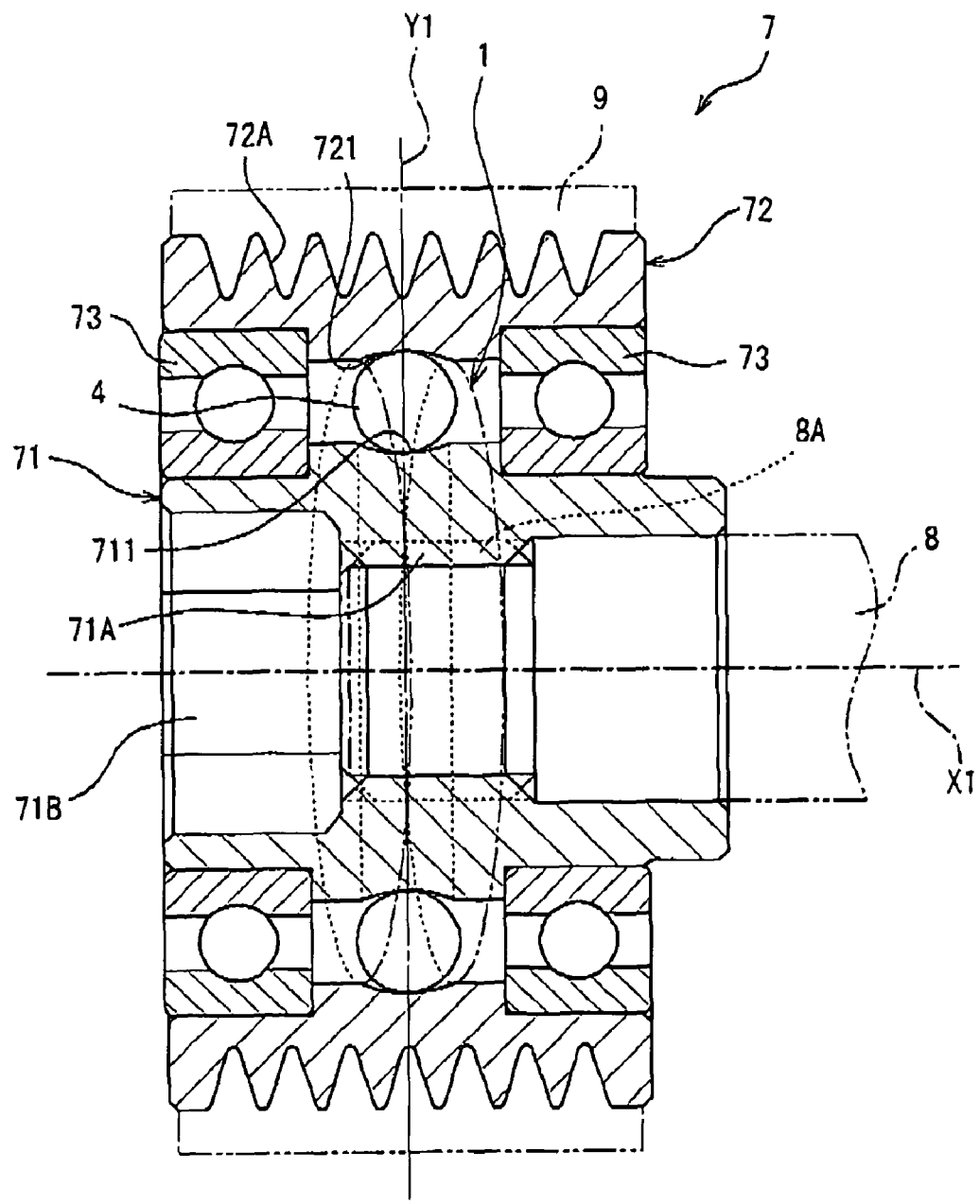
FIG. 9 is a cross-sectional view of the pulley device to which the rotation urging mechanism in accordance with the second embodiment is applied.

FIG. 8 is a cross-sectional view of a pulley device 7 having the rotation urging mechanism 1 in accordance with the first embodiment. FIG. 9 is a cross-sectional view of the pulley device 7 having the rotation urging mechanism 1 in accordance with the second embodiment. This pulley device 7 is used by being mounted on an input shaft 8 of an alternator used as an auxiliary machine of, for example, an engine of an automobile or the like. The pulley device 7 includes a pulley boss (shaft) 71 formed in a hollow cylindrical shape; a cylindrical pulley member 72 disposed coaxially on the outer peripheral side of this pulley boss; and two rolling bearings 73 interposed therebetween. Further, the rotation urging mechanism 1 is provided between these two rolling bearings 73.

A corrugated groove is formed on an outer peripheral surface 72A of the pulley member 72, and a belt 9 for transmitting the torque from the crankshaft of the engine is wound around that outer peripheral surface 72A.

The input shaft 8 projectingly provided on an unillustrated alternator is inserted into the inner peripheral side of the pulley boss 71. In addition, an internally threaded portion 71A is integrally formed on an axially midway portion of the inner peripheral surface of the pulley boss 71. As an externally threaded portion 8A provided on an end portion of the input shaft 8 is threadedly engaged with the internally threaded portion 71A, the pulley boss 71 is coupled with the input shaft 8 so as to be integrally rotatable therewith. In addition, a hexagonal wrench inserting portion 71B for inserting a hexagonal wrench for allowing the pulley boss 71 to be threadedly engaged with the internally threaded portion 71A is formed in an inner peripheral-side end portion of the pulley boss 71.

The rolling bearing 73 render the pulley boss 71 and the pulley member 72 relatively rotatable with each other, and supports the radial load acting on the pulley member 72.

The rotation urging mechanism has the pulley member 72 serving as the outer member (outer ring), the pulley boss 71 serving as the inner member (inner ring), and the balls 4. An outer raceway surface 721 is formed on the inner peripheral surface of the pulley member 72, an inner raceway surface 711 is formed on the outer peripheral surface of the pulley boss 71, and the plurality of balls 4 are disposed between the outer raceway surface 721 and the inner raceway surface 711. The detailed construction of these portions has already been described with reference to FIGS. 1 to 7B. It should be noted that the outer raceway surface 721 and the inner raceway surface 711 may not be directly formed on the pulley member 72 and the pulley boss 71, and may be respectively formed on an outer member fixed to the inner peripheral surface of the pulley member 72 and an inner member fixed to the outer peripheral surface of the pulley boss 71.

It should be noted that in the case where the rotation urging mechanism 1 in accordance with the first embodiment is applied (FIG. 8), the cages 5 are respectively disposed between the adjacent ones of the balls 4. In addition, in the case where the rotation urging mechanism 1 in accordance with the second embodiment is applied (FIG. 9), two balls 4 are disposed between the outer raceway surface 721 and the inner raceway surface 711.

In this embodiment, when the pulley member 72 is rotated by the rotational driving force transmitted from the crankshaft of the engine through the belt 9, the outer raceway surface 721 is relatively moved in the circumferential direction with respect to the inner raceway surface 711 and is also relatively moved in the axial direction as well. Then, as described with reference to FIGS. 2A to 3B, as the balls 4 are clamped firmly between the vicinity of the shoulder portion of the outer raceway surface 721 and the vicinity of the shoulder portion of the inner raceway surface 711, the relative movement of the outer raceway surface 721 and the inner raceway surface 711 is restricted. Hence, the pulley boss 71 is integrally rotated together with the pulley member 72 to rotate the input shaft 8 of the alternator.

When a variation of rotation occurs between the pulley member 72 and the pulley boss 71 owing to the variation of rotation of the crankshaft, the variation of rotation can be resiliently alleviated by the relative rotation between the pulley member 72 and the pulley boss 71. In addition, as the variation of the rotational speed of the crankshaft is alleviated, it is possible to effectively suppress the slippage occurring between the belt 9 and the pulley member 72. For this reason, the initial tension of the belt 9 can be set low, thereby making it possible to decrease the load on the crankshaft and improve the fuel consumption performance of the engine.

The present invention may be altered in design, as required, without being limited to the above-described embodiment. For example, the angle of inclination of the second axis X2 and the angle of inclination of the third axis X3 with respect to the first axis X1 may not necessarily be aligned with each other, and these angles of inclination may be made different insofar as the both raceway surfaces 21 and 31 are opposed to each other over the entire circumference, and the disposing space for the balls 4 can be secured between their opposing surfaces.

The rotation urging mechanism 1 in accordance with the invention may be also applied to, for example, a crank pulley, a pulley for a car air-conditioner, an auto tensioner, and the like, in addition to the pulley device for an alternator. In addition, the rotation urging mechanism 1 in accordance with the invention may also be used for a clutch disk of a clutch. Furthermore, by attaching an angle sensor capable of measuring the rotational angle between the inner and outer rings, the rotation urging mechanism 1 in accordance with the invention may be used as a torque sensor.

What is claimed is:

1. A rotation urging mechanism comprising:
an outer member which includes an outer raceway surface on an inner periphery thereof and is rotatable about a first axis;
an inner member which includes, on an outer periphery thereof, an inner raceway surface disposed in face-to-face relation to a radially inner side of the outer raceway surface over an entire circumference thereof and is rotatable about the first axis; and
a plurality of balls disposed rollably between the outer raceway surface and the inner raceway surface,
wherein the outer raceway surface is formed about a second axis which is inclined with respect to the first axis, and the inner raceway surface is formed about a third axis which is inclined with respect to the first axis,
wherein cages, for respectively maintaining intervals between adjacent ones of the balls, are respectively provided between the adjacent ones of the plurality of balls,
wherein the cages are separated from each other in a circumferential direction, and
wherein the inner raceway surface comprises a concave shape and the outer raceway surface comprises a concave shape such that, as the plurality of balls move in an axial direction of the first axis, a relative rotation between the outer raceway surface and the inner raceway surface is restricted such that the inner member and the outer member rotate integrally.

2. The rotation urging mechanism according to claim 1, wherein angles of inclination of the second and third axes with respect to the first axis are identical.

3. The rotation urging mechanism according to claim 1, wherein a distance between an axially outermost portion of the outer raceway surface and an axially outermost portion of the outer member, in a first axial direction, is greater than a distance between an axially outermost portion of the inner raceway surface and an axially outermost portion of the inner member, in the first axial direction.

4. The rotation urging mechanism according to claim 1, wherein one of the inner raceway surface and the outer raceway surface comprises a width, in a second axial direction or a third axial direction respectively, greater than a width of the other one of the inner raceway surface and the outer raceway surface, in the second axial direction or the third axial direction respectively.

5. The rotation urging mechanism according to claim 1, wherein the inner raceway surface comprises a width greater than a width of the outer raceway surface.

6. The rotation urging mechanism according to claim 1, wherein the inner raceway surface and the outer raceway surface are formed such that, when the inner member and the outer member are rotated relative to one another, a ball of the plurality of balls is clamped in the axial direction between the inner raceway surface and the outer raceway surface such that the inner member and the outer member rotate integrally.

7. The rotation urging mechanism according to claim 1, wherein a radius of curvature of a cross-section of the inner raceway surface is greater than a radius of curvature of a ball of the plurality of balls.

8. The rotation urging mechanism according to claim 1, wherein a radius of curvature of a cross-section of the outer raceway surface is greater than a radius of curvature of a ball of the plurality of balls.

9. The rotation urging mechanism according to claim 1, wherein the inner raceway surface and the outer raceway surface are formed such that, when the inner raceway surface is rotated circumferentially relative to the outer raceway surface, the inner raceway surface moves axially relative to the outer raceway surface.

10. The rotation urging mechanism according to claim 1, wherein an inner periphery of the inner member is parallel to the first axis.

11. The rotation urging mechanism according to claim 1, wherein an outer periphery of the outer member is parallel to the first axis.

12. The rotation urging mechanism according to claim 1, wherein an inner periphery of the inner member is parallel to the first axis and an outer periphery of the outer member is parallel to the first axis.

13. The rotation urging mechanism according to claim 1, wherein an inclination angle of the second axis with respect to the first axis is not equal to an inclination angle of the third axis with respect to the first axis.

14. The rotation urging mechanism according to claim 1, wherein one of the inner raceway surface and the outer raceway surface comprises a width greater than a width of an other of the inner raceway surface the outer raceway surface.

15. The rotation urging mechanism according to claim 1, wherein a radius of curvature, in an axial direction, of one of the inner raceway surface and the outer raceway surface is greater than a radius of curvature, in an axial direction, of the other one of the inner raceway surface and the outer raceway surface.

16. A pulley device comprising:
a pulley member having an outer periphery around which a belt is wound;
a shaft disposed on an inner peripheral side of the pulley member coaxially with the pulley member; and
a rotation urging mechanism disposed between the pulley member and the shaft,
wherein the rotation urging mechanism includes:
an outer raceway surface provided on an inner peripheral side of the pulley member;
an inner raceway surface disposed on an outer peripheral side of, the shaft in face-to-face relation to a radially inner side of the outer raceway surface over an entire circumference thereof; and
a plurality of balls disposed rollably between the outer raceway surface and the inner raceway surface,
wherein the outer raceway surface is formed about a second axis which is inclined with respect to an axis of rotation of the pulley member, and the inner raceway surface is formed about a third axis which is inclined with respect to the axis of rotation of the pulley member,
wherein cages, for respectively maintaining intervals between adjacent ones of the balls, are respectively provided between the adjacent ones of the plurality of balls,
wherein the cages are separated from each other in a circumferential direction, and
wherein the inner raceway surface comprises a concave shave and the outer raceway surface comprises a concave shape such that, as the plurality of balls move in an axial direction of the first axis, a relative rotation between the outer raceway surface and the inner raceway surface is restricted such that the inner member and the outer member rotate integrally.

* * * * *